Oct. 4, 1966  R. H. ANDRESEN ETAL  3,276,780
VIBRATION CONTROL FOR BELLOWS SEAL
Filed Dec. 19, 1963
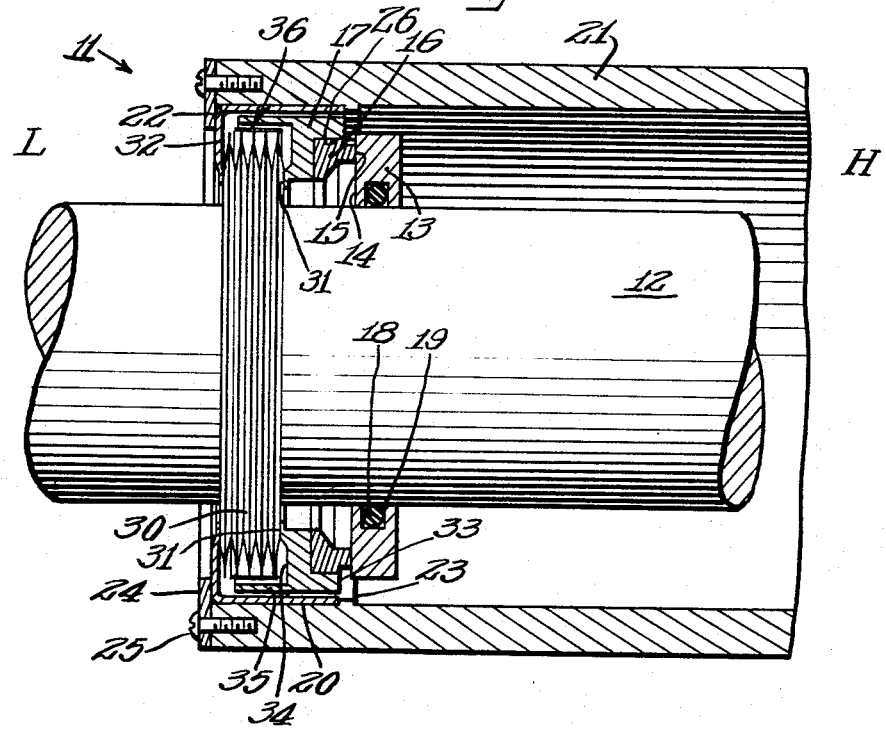
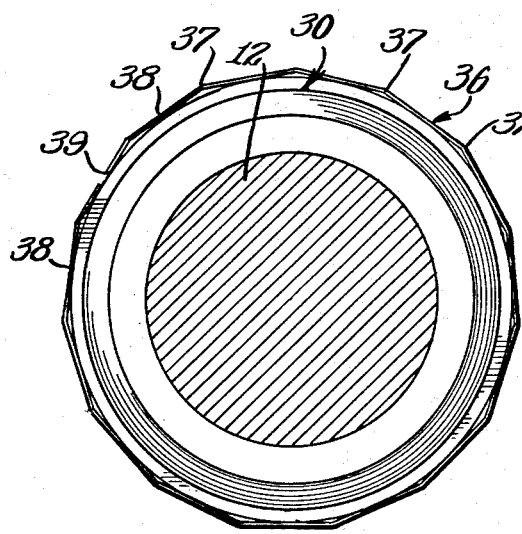
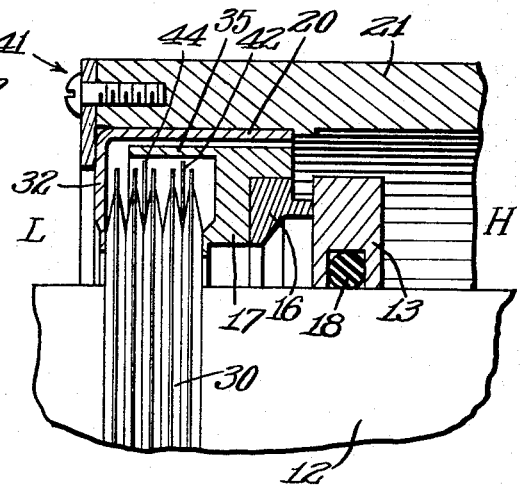
INVENTORS
Raymond H. Andresen
Charles F. Glut
by
Hill, Sherman, Meroni, Gross & Simpson  ATTORNEYS United States Patent Office 3,276,780
Patented Oct. 4, 1966

3,276,780
VIBRATION CONTROL FOR BELLOWS SEAL
Raymond H. Andresen, Barrington, and Charles F. Glut, Chicago, Ill., assignors to Gits Bros. Mfg. Co., Chicago, Ill., a corporation of Delaware
Filed Dec. 19, 1963, Ser. No. 331,850
12 Claims. (Cl. 277—42)

This invention relates generally to vibration and roll dampened shaft seals and more particularly relates to bellows shaft seals which will prevent rolling and excessive vibration of the bellows.

Known rotary shaft seals include expansible bellows for sealing the stationary seal ring to a housing and for maintaining this ring against a mating ring on the shaft. This type of shaft seal employs an axially expansible and contractible bellows, usually made of metal, around the shaft and sealed at its opposite ends to the stationary seal rings and the seal casing. The bellows accommodates axial movement of the stationary seal ring and provides an absolute secondary seal while acting as a resilient biasing means to hold the stationary sealing ring against the shaft carried rotating mating ring.

In operation, such bellows equipped shaft seals tended to wobble or roll whenever the mating faces of the seal rings deviated from a plane exactly normal to the bellows axis or whenever the shaft deviated from a fixed axis of rotation. Even slight degrees of cocking of the mating seal faces or shaft runout from a fixed axis of rotation would initiate a wobbling rolling action of the bellows similar to that exhibited by dropping a circular coin from an inclined position onto a flat smooth surface. Such a dropped coin will wobble and spin as it comes to rest flatwise. This wobbling or rolling of the bellows seal soon sets up sympathetic vibrations which are detrimental to the proper operation of the seal.

It is then an object of this invention to provide a shaft seal with roll preventing and vibration dampening means.

Another object of this invention is to provide a bellows type shaft seal with means which will prevent wobbling or rolling of the bellows.

A still further object of the invention is to provide a rotary bellows seal with an extended carrier ring in closely spaced relation to a surrounding casing for contacting the casing to snub wobbling of the bellows and to equip the bellows with dampening fingers which will contact the carrier ring for stopping vibration of the bellows.

It is further another object of the present invention to provide a rotary shaft bellows seal assembly having a seal adapter ring with an axially extending leg portion cooperating with an outer cover member to prevent rolling or wobbling of the bellows seal member.

It is still another object of the present invention to provide a bellows seal assembly utilizing a bellows member having dampening means extending from the sides thereof and adapted to permit free axial expansion and contraction of the bellows member while preventing wobbling or rolling thereof.

It is still another object of the present invention to provide a rotary bellows seal assembly having an outer cover which cooperates with the bellows member to dampen roll or wobbling motion of the bellows member as well as dampening means attached to the sides of the bellows member to dampen and prevent wobbling motion thereof.

Other objects, features, and advantages of the present invention will become apparent to those skilled in the art after considering the following description taken in conjunction with the drawing wherein like reference numerals referred to like in corresponding parts.

In the drawings:
FIGURE 1 is a partial longitudinal cross-sectional view with parts in elevation of a rotary bellows seal assembly constructed in accordance with the principles of the present invention;
FIGURE 2 is an elevational view of a dampening means utilized in the seal assembly illustrated in FIGURE 1;
FIGURE 3 is a fragmentary longitudinal cross-sectional view with parts in elevation of another embodiment of a rotary bellows seal assembly constructed in accordance with the principles of the present invention.

As shown in the drawings:
Referring to FIGURE 1, there is illustrated a bellows seal assembly 11 surrounding a rotating shaft 12 for preventing the leakage of fluid therealong. The seal assembly has a rotating ring 13 with an annular radial sealing face 14 engaged by an annular radial stationary sealing face 15 at the end of a stationary sealing ring 16. The ring 16 is part of a stationary sealing ring unit which includes an adapter or carrier ring 17.

The rotating ring 13 is suitably mounted on the shaft 12 for rotation therewith such as by being mounted thereon in close fitting relationship and sealed thereto and driven in rotation thereby through a compressible O-ring 18 which seals in an inner groove 19 in the ring 13.

Surrounding the seal assembly is a casing ring or sleeve 20 which is supported in an annular housing 21 with a suitable opening 22 to receive the casing sleeve 20. One end of sleeve 20 abuts against an annular inner ridge 23 in the housing 21 and its other end is held in place by a clamping ring 24 secured to the housing by screws 25.

The tubular carrier ring 17 has an inner annular end wall 33 and an outer annular end wall 34. A recess 26 is formed in the inner end wall 33 and the carrier ring supports the stationary sealing ring 16 by having the sealing ring 16 seated in the recess 26. An annular dampener projection 35 integrally projects axially from the periphery of the outer end wall 34. The carrier ring is biased axially to hold the stationary ring annular end face 15 against the rotating ring face 14, and rotational movement of the carrier ring is prevented by suitable key means (not shown) such as an axial rib projecting inwardly from the casing sleeve 20, there being a suitable axial groove in the carrier ring that is sized to straddle the axial rib and permit axial movement of the carrier ring along the sleeve 20. Movement to the extreme right may be limited by the end of the groove if desired.

Biasing force for the stationary sealing ring 16 is obtained from an annular metal bellows 30 which is expansible and which provides a secondary seal to permit axial movement of the stationary ring 16. The metal bellows is secured at one end to the carrier ring by a weld at 31. The other end of the bellows is secured to the upper surface of the downturned other end 32 of the casing sleeve 20.

In general, the seal is employed for a rotating shaft 11 with the rotating ring 13 turning with the shaft and the stationary ring 16 engaging the ring 13 to provide a seal to prevent the leakage of higher pressure fluid from the zone indicated by H to the left to the lower fluid pressure zone indicated by L. However, any initial cocking of the mating ring 13 or stationary ring 16 from positions which place the mating faces thereof exactly normal to the axis of rotation or any shaft runout from a fixed axis of rotation normal to the mating faces of these rings will cause the bellows to wobble and roll. This wobbling which is a pivoting motion towards and away from the bellows axis, causes sympathetic vibrations or movement to the carrier ring 17 which is secured thereto. Such pivoting action on the carrier ring causes portions of the sealing ring 16 to move out of sealing contact with the stationary ring 13 and thus permit fluid to pass from the zone H into the bellows and then to zone L. In order to prevent this detrimental wobbling motion of the bellows and carrier, the outer diameter of the carrier and carrier projection, the inner diameter of the casing sleeve, and the length of the carrier and carrier projection are predetermined such that the casing sleeve and carrier will cooperate with each other to dampen any rolling or wobbling motion of the carrier. That is, when the carrier tends to wobble or roll, the outer diameter surface of the projection 35 as well as the carrier will contact the inner diameter surface of the casing sleeve which will dampen any roll or wobbling motion of the carrier. If the length of the carrier projection is too short, this will allow the carrier to have a large rolling or pivotal motion which is not readily dampened. However, by having the carrier projection of a sufficient length, any tendency to roll or wobble is immediately snubbed.

It has been found that the ratio or relationship of the clearance between the carrier and casing and the length of the carrier in the casing should be such as to limit the maximum angular deflection of the carrier to about 2°. The length-clearance ratio is therefore determined to permit not more than about 2 degrees of deflection before the carrier and casing will contact.

To dampen vibrations of the bellows relative to the carrier ring the seal assembly 11 may be provided with a very thin lightweight metal ribbon 36 best shown in FIG. 2. This ribbon 36 is corrugated or polygonal and is interposed between the bellows 30 and the extension 35 of the carrier ring 17 to lightly contact the extension 35 at its peaks 37 and the outer periphery of the bellows 30 at its valleys or flats 38. The ribbon can be split at 39 for ease in assembly and can have a light spring expansion effect when the split gap is closed for exerting a light spring seating force on the extension. However, the contact with the peaks of the bellows 30 by the valleys or flats 38 is so light that free bellows action cannot be impeded. The width of the ribbon 36 is slightly smaller than the distance between the end wall 34 of the carrier ring and the end wall 32 of the casing when the carrier ring is in its fully retracted position in the casing and is wider than the gap between the end wall 32 and rear of the carrier extension 35 when the carrier ring is in its fully expanded position. Thus the ribbon cannot interfere with free expansion and contraction of the bellows and yet cannot move out of the space between the bellows and extension 35 even though it may be free to move endwise due to its very light seating contact with both the extension and bellows. Of course the ribbon 36 should be sufficiently wide to span the space between several bellows peaks so that it cannot retract with the valleys of the bellows.

In operation the ribbon 36 acts as a light hair spring, dampening any vibrations of the bellows which could be induced by wobbling of the carrier ring or otherwise. The ribbon is loose between the bellows and carrier ring and may have a large number of sides to insure contact between the bellows and extension of the carrier ring at least at two areas. From 15 to 18 sides are desirable but as the distance between the bellows and extension increases the number of sides can decrease to provide longer sides for bridging the increased gap.

Referring to FIGURE 3, there is illustrated a rotary bellows seal assembly 41 similar to the rotary bellows seal assembly 11 described above. However, this assembly 41 has connected between the convolutions 42 of the bellows 30 at least one dampening ring 42 (FIGURE 3). The dampening ring 42 is a thin metal (steel) washer or split ring. The circumference 44 of the ring 42 is sized so that it will engage the inner diameter of the carrier projection 35 when the bellows 30 tends to wobble or roll to dampen said wobbling or rolling motion.

The dampening ring 42 is secured to a valley of the bellows lying within the extension 35 so as not to interfere with the bellows action. The ring can be anchored by welding and as illustrated the number of rings may be varied in accordance with the amount of dampening desired.

As shown the rotary bellows seal assembly 41 has two dampening rings 42 connected thereto with their outer circumferences or peripheries 44 spaced a predetermined distance from the inner diameter surface of the carrier projection 35 to allow free axial movement of the bellows. However, when the bellows starts to wobble, the carrier projection 35 cooperates with the casing sleeve 20 to limit the carrier from pivoting about the shaft axis, as was described above and the peripheries 44 of the dampening rings 42 will touch the inner diameter surface of the carrier projection to dampen vibration of the bellows.

It is of course understood that the dampening rings need not be connected between the bellows convolutions but may be connected to the bellows as desired where they will not interfere with bellows action i.e. around the peaks of the convolutions.

Therefore, it is seen where we have provided an improved rotary bellows seal assembly which will substantially maintain its axial expansion and contraction and will prevent wobbling or rolling of the bellows seal means.

It is of course understood that other modifications and variations of the present invention may be made in accordance with the principles of the present invention without departing from the inventive concepts thereof. It is accordingly, our intention that the scope of the present invention be limited solely by that of the hereinafter appended claims.

We claim as our invention:

1. In a rotary seal assembly for a rotating shaft member having a rotating ring and a stationary ring having a sealing surface sealingly engaging the rotating ring, a carrier ring having an inner end wall and an outer end wall, said stationary sealing ring being supported by said carrier ring inner end wall, an annular dampener extension axially projecting from the periphery of the carrier ring outer end wall, an expansible annular bellows surrounding said shaft member with one end and sealed to said carrier ring outer end wall, a casing sleeve having one end spaced from and facing the carrier ring outer end wall, the other end of said metal bellows being sealed to said casing sleeve one end, said casing sleeve having an inner diameter greater than the outer diameter of said carrier ring and dampener extension, means to prevent the axial movement of said casing sleeve, and the length of said carrier ring and dampener extension, the corresponding overlapping length of said casing sleeve, and the distance between the carrier ring outer diameter and the casing sleeve inner diameter being predetermined such that the carrier wing outer surface and the outer diameter surface of the dampener extension will only contact the inner surface of the casing sleeve when the bellows tends to wobble to snub said wobbly motion whereby sealing contact between the end face of sealing ring and the rotating ring is maintained and vibration of the bellows is prevented.

2. In a rotary seal assembly for a rotating shaft member having a rotating ring and a stationary carbon ring having a sealing surface sealingly engaging the rotating ring, an adapter ring having an inner end wall and an outer end wall, said stationary carbon sealing ring being supported by said adapter inner ring end wall, an integral dampener extension axially projecting from the periphery of the carrier ring outer end wall,
an expansible bellows surrounding said shaft member with one end and sealed to said adapter ring outer end wall,
a casing sleeve end spaced from and facing the carrier ring outer end wall,
the other end of said metal bellows being sealed to said casing sleeve one end,
said casing sleeve having an inner diameter greater than the outer diameter of said adapter ring and dampener extension,
means to prevent the axial movement of said casing sleeve, and
the length of said adapter ring and dampener extension, the corresponding overlapping length of said casing sleeve, and the distance between the carrier ring outer diameter and the casing sleeve inner diameter being predetermined such that the adapter ring outer surface and the outer diameter surface of the dampener extension will only contact the inner surface of the casing sleeve when the bellows tends to wobble to snub said wobbly motion,
whereby sealing contact between the end face of sealing ring and the rotating ring is maintained and vibration of the bellows is prevented.

3. In a rotary seal assembly for a rotating shaft member having a rotating ring and a stationary ring having a sealing surface sealingly engaging the rotating ring,
a carrier ring having an inner end wall and an outer end wall,
said stationary sealing ring being supported by said carrier ring,
an integral annular dampener extension axially projecting from the periphery of the carrier ring outer end wall,
an expansible annular bellows surrounding said shaft member with one end and sealed to said carrier ring outer end wall,
a casing sleeve having one end spaced from and facing the carrier ring outer end wall,
the other end of said metal bellows being sealed to said casing sleeve turned end,
said casing sleeve having an inner diameter greater than the outer diameter of said carrier ring and dampener extension and having its other end projecting at least to the carrier ring inner end wall,
means to prevent the axial movement of said casing sleeve, and
the length of said carrier ring and dampener extension, the corresponding overlapping length of said casing sleeve, and the distance between the carrier ring outer diameter and the casing sleeve inner diameter being predetermined such that the carrier ring outer surface and the outer diameter surface of the dampener extension will only contact the inner surface of the casing sleeve when the bellows tends to wobble to snub said wobbly motion,
whereby sealing contact between the end face of sealing ring and the rotating ring is maintained and vibration of the bellows is prevented.

4. A rotary seal assembly for a rotating shaft member comprising:
an annular housing having therein
a rotating ring mounted on said shaft member for rotation therewith,
said rotating ring having an inner annular groove formed therein,
a carrier ring having an inner annular end wall and an outer annular end wall,
a stationary sealing ring being supported by said carrier ring and having an annular sealing face engaging the annular end wall of the rotating ring to form a seal therewith,
an integral annular dampener extension axially projecting from the periphery of the carrier ring outer end wall,
an annular metal bellows having one end connected to said carrier ring outer end wall,
a casing sleeve connected to the inner diameter of the housing and having one end spaced from and facing the carrier ring outer end wall,
the other end of said metal bellows being connected to said casing sleeve one end,
said casing sleeve having an inner diameter greater than the outer diameter of said carrier ring and dampener extension and having its other end projecting at least to the carrier ring inner end wall,
means to prevent the axial movement of said casing sleeve, and
the length of said carrier ring and dampener extension, the corresponding overlapping length of said casing sleeve, and the distance between the carrier ring outer diameter and the casing sleeve inner diameter being predetermined such that the carrier ring outer surface and the outer diameter surface of the dampener extension will only contact the inner surface of the casing sleeve when the bellows tends to wobble to snub said wobbly motion,
whereby sealing contact between the end face of sealing ring and the rotating ring is maintained and vibration of the bellows is prevented.

5. In a rotary seal assembly for a rotating shaft member having a rotating ring and a stationary ring having a sealing surface sealingly engaging the rotating ring,
a carrier ring having an inner end wall and an outer end wall,
a recess formed in the carrier ring inner end wall, said stationary sealing ring being supported by said carrier ring,
a dampener extension axially projecting from the periphery of the carrier ring outer end wall, an expansible bellows surrounding said shaft member with one end sealed to said carrier ring outer end wall,
a casing sleeve having an inwardly turned end spaced from and facing the carrier ring outer end wall,
the other end of said metal bellows being sealed to said casing sleeve downturned end, and
at least one dampening means interposed between the bellows and said dampener extension,
said dampening means engaging both the bellows and the inner diameter surface of said dampener extension during wobbling of the bellows to snub the wobbling of the bellows
whereby sealing contact between the end face of sealing ring and the rotating ring is maintained and vibration of the bellows is prevented.

6. In a rotary seal assembly for a rotating shaft member having a rotating ring and a stationary ring having a sealing surface sealingly engaging the rotary ring,
a carrier ring having an inner end wall and an outer end wall,
said stationary sealing ring being supported by said carrier ring inner end wall,
a dampener extension axially projecting from the periphery of the carrier ring outer end wall,
an expansible annular bellows surounding said shaft member with one end sealed to said carrier ring outer end wall,
a casing sleeve having one end spaced from and facing the carrier ring outer end wall,
the other end of said metal bellows being sealed to said casing sleeve one end,
a dampening ribbon ring interposed between the bellows and said dampener extension,
said dampening ribbon ring being a polygon with its sides contacting the bellows and having apexes contacting the inner diameter surface of said dampener extension, whereby sealing contact between the end face of sealing ring and the rotating ring is maintained and vibration of the bellows is prevented.

7. In a rotary seal assembly for a rotating shaft member having a rotating ring and a stationary ring having a sealing surface sealingly engaging the rotary ring, a carrier ring having an inner annular end wall and an outer annular end wall, a recess formed in the carrier ring inner end wall, said stationary sealing ring being supported in said carrier ring recess, an annular dampener extension axially projecting from the periphery of the carrier ring outer end wall, an expansible metal bellows surrounding said shaft member with one end to said carrier ring outer end wall, a casing sleeve having an inwardly turned end spaced from and facing the carrier ring outer end wall, the other end of said metal bellows being welded to said casing sleeve downturned end, at least one dampening ring connected between the convolutions of the bellows within said dampener extension, said dampening ring having an outer periphery spaced a predetermined distance from the inner diameter surface of said dampener extension, and the space between said outer periphery and the inner surface of the dampener extension being such that when the bellows tends to wobble the periphery will contact the inner surface of the extension to snub the wobbling of the bellows whereby sealing contact between the end face of sealing ring and the rotating ring is maintained and vibration of the bellows is prevented.

8. A rotary seal assembly for a rotating shaft member comprising:

an annular housing having therein a rotating ring mounted on said shaft member for rotation therewith, a carrier ring having an inner annular end wall and an outer annular end wall, a recess formed in the carrier ring inner end wall, a stationary sealing ring being supported in said carrier ring recess and having an annular sealing face engaging the annular end wall of the rotating ring to form a seal therewith, an annular dampener extension axially projecting from the periphery of the carrier ring outer end wall, an expansible annular metal bellows surrounding said shaft member with one end sealed to said carrier ring outer end wall, a casing sleeve having an outer diameter equal to the inner diameter of the housing and an inwardly turned end wall spaced from and facing the carrier ring outer end wall, the other end of said metal bellows being welded to said casing sleeve turned end wall, a light spring metal ribbon annulus between the bellows and said dampener extension, said ribbon annulus being a polygon with sides at least some of which are bottomed and having at least some of its apexes engaging the inner diameter surface of said dampener extension, whereby sealing contact between the end face of sealing ring and the rotating ring is maintained and vibration of the bellows is prevented.

9. A rotary seal assembly for a rotating shaft member comprising:

an annular housing having therein a rotating ring mounted on said shaft member for rotation therewith, said rotating ring having an inner annular groove formed therein, a resilient O-ring sealed in said annular groove and sealingly supporting said rotating ring on said shaft member, a carrier ring having an inner annular end wall and an outer annular end wall, a recess formed in the carrier ring inner end wall, a stationary carbon sealing ring being supported in said carrier ring recess and having an annular sealing face engaging the annular end wall of the rotating ring to form a seal therewith, an integral annular dampener extension axially projecting from the periphery of the carrier ring outer end wall, an expansible annular metal bellows surrounding said shaft member with one end sealed to said carrier ring outer end wall, a casing sleeve having an outer diameter equal to the inner diameter of the housing and an inwardly turned end wall spaced from and facing the carrier ring outer end wall, the other end of said metal bellows being welded to said casing sleeve turned end wall, a plurality of dampening rings secured between the convolutions of the bellows and extending radially from the bellows within said dampener extension, each dampening ring having an outer periphery spaced a predetermined distance from the inner diameter surface of said dampener extension when the bellows is not vibrating or wobbling, and said outer periphery engaging the inner surface of the dampener extension when the bellows starts to vibrate or wobble to snub the vibration or wobbling of the bellows whereby sealing contact between the end face of sealing ring and the rotating ring is maintained and vibration of the bellows is prevented.

10. In a rotary seal assembly for a rotating shaft member having a rotating ring and a stationary sealing ring having a sealing surface sealingly engaging the rotating ring, a carrier ring having an inner annular end wall and an outer annular end wall, said stationary sealing ring being supported by said carrier ring, an integral annular dampener extension axially projecting from the periphery of the carrier ring outer end wall, an expansible annular metal bellows surrounding said shaft member with one end sealed to said carrier ring outer end wall, a casing sleeve having an inwardly turned end spaced from and facing the carrier ring outer end wall, the other end of said metal bellows being sealed to said casing sleeve turned end, said casing sleeve having an inner diameter greater than the outer diameter of said carrier ring and having its other end projecting at least to the carrier ring inner end wall, a light spring metal dampening ring interposed between the bellows and said dampener extension, said dampening ring being a polygon with 15–18 sides at least some of which are bottomed on the bellows and the ends of some of which being bottomed on the extension of said carrier ring, the length of said carrier ring and dampener extension, the corresponding overlapping length of said casing sleeve, and the distance between the carrier ring outer diameter and the casing sleeve inner diameter being predetermined such that the carrier ring outer surface will contact the inner surface of the casing sleeve when the bellows tends to wobble to snub said wobbly motion, and said dampening ring ends will contact the inner surface of the extension to snub the wobbling of the bellows whereby sealing contact between the end face of sealing ring and the rotating ring is maintained and vibration of the bellows is prevented.

11. A rotary seal assembly for a rotating shaft member comprising:

an annular housing having therein a rotating ring mounted on said shaft member for rotation therewith, said rotating ring having an inner annular groove formed therein, a carrier ring having an inner annular end wall and an outer annular end wall, a recess formed in the carrier ring inner end wall, a stationary carbon sealing ring being supported in said carrier ring recess and having an annular sealing face engaging the annular end wall of the rotating ring to form a seal therewith, an integral annular dampener extension axially projecting from the periphery of the carrier ring outer end wall, an annular metal bellows welded at one end to said carrier ring outer end wall, a casing sleeve having an outer diameter equal to the inner diameter of the housing and an inwardly turned end wall spaced from and facing the carrier ring outer end wall, the other end of said metal bellows being welded to said casing sleeve turned end wall, said casing sleeve having an inner diameter greater than the outer diameter of said carrier ring and having its other end projecting at least to the carrier ring inner end wall, at least one dampening ring connected between the convolutions of the bellows within said dampener extension, said dampening ring being spaced a predetermined distance from the inner diameter surface of said dampener extension, the length of said carrier ring and dampener extension, the corresponding overlapping length of said casing sleeve, and the distance between the carrier ring outer diameter and the casing sleeve inner diameter being predetermined such that the carrier ring outer surface will contact the inner surface of the casing sleeve when the bellows tends to wobble to snub said wobbly motion, and said dampening ring being spaced from the inner surface of the dampener extension a distance such that when the bellows tends to wobble the ring will contact the inner surface of the extension to snub the wobbling of the bellows whereby sealing contact between the end face of sealing ring and the rotating ring is maintained and vibration of the bellows is prevented.

12. A rotary seal assembly for a rotating shaft member comprising:

an annular housing having therein a rotating ring mounted on said shaft member for rotation therewith, said rotating ring having an inner annular groove formed therein, a resilient O-ring seated in said annular groove and sealingly supporting said rotating ring on said shaft member, a carrier ring having an inner annular end wall and an outer annular end wall, a recess formed in the carrier ring inner end wall, a stationary carbon sealing ring being supported in said carrier ring recess and having an annular sealing face engaging the annular end wall of the rotating ring to form a seal therewith, an integral annular dampener extension axially projecting from the periphery of the carrier ring outer end wall, an annular metal bellows welded at one end to said carrier ring outer end wall, a casing sleeve having an outer diameter equal to the inner diameter of the housing and an inwardly turned end wall spaced from and facing the carrier ring outer end wall, the other end of said metal bellows being welded to said casing sleeve turned end wall, said casing sleeve having an inner diameter greater than the outer diameter of said carrier ring and having its other end projecting at least to the carrier ring inner end wall, at least one dampening washer connected between the convolutions of the bellows within said dampener extension, said dampening washer being normally spaced a predetermined distance from the inner diameter surface of said dampener extension, the length of said carrier ring and dampener extension the corresponding overlapping length of said casing sleeve, and the distance between the carrier ring outer diameter and the casing sleeve inner diameter being predetermined such that the carrier ring outer surface and the outer diameter surface of the dampener extension will contact the inner surface of the casing sleeve when the bellows tends to wobble to snub said wobbly motion, and said dampening washer being spaced from the inner surface of the dampener extension such that when the bellows tends to wobble the ring will contact the inner surface of the extension to snub the wobbling of the bellows whereby sealing contact between the end face of sealing ring and the rotating ring is maintained and vibration of the bellows is prevented.

References Cited by the Examiner

UNITED STATES PATENTS

| | | | |
|---|---|---|---|
| 1,822,052 | 9/1931 | Maccabee | 277—88 |
| 2,094,160 | 9/1937 | Oldberg | 277—88 |
| 2,115,346 | 4/1938 | Summers | 277—88 |
| 2,174,623 | 10/1939 | Dasher | 277—88 |
| 2,434,794 | 1/1948 | Giesler | 277—88 |
| 2,574,808 | 11/1951 | Wolfe | 277—83 |
| 3,109,659 | 11/1963 | Gits et al. | 277—91 X |
| 3,124,363 | 3/1964 | Cieslik | 277—88 X |

SAMUEL ROTHBERG, *Primary Examiner.*